United States Patent [19]

Pickles

[11] 4,035,866
[45] July 19, 1977

[54] SEAT RECLINER HINGE ASSEMBLY
[75] Inventor: Joseph Pickles, Birmingham, Mich.
[73] Assignee: Ferro Manufacturing Corporation, Detroit, Mich.
[21] Appl. No.: 679,756
[22] Filed: Apr. 23, 1976
[51] Int. Cl.² ............................................ E05D 11/10
[52] U.S. Cl. ............................................ 16/146
[58] Field of Search .................... 297/355, 366–372, 297/379, 354; 16/139, 144, 145, 146, 147, 141

[56] References Cited
U.S. PATENT DOCUMENTS

| 3,840,268 | 10/1974 | Turner et al. | 297/366 |
| 3,973,288 | 8/1976 | Pickles | 16/146 |

Primary Examiner—G. V. Larkin
Attorney, Agent, or Firm—Whittemore, Hulbert & Belknap

[57] ABSTRACT

A hinge assembly for a reclining vehicle seat comprising essentially two plates pivoted together, one of the plates having an arcuate edge surface a part of which is provided with locking teeth and the remainder of which is smooth. A locking pawl is movably connected to the other plate and has teeth movable into locking engagement with the teeth on the arcuate portion. Resilient means are provided urging the toothed portions of the pawl toward the arcuate edge portion, the angular extent and location of the toothed and smooth parts of the arcuate edge portion and the toothed portion of said pawl being such that during movement between a seat and seat back respectively connected to said plates between an intermediate erect position of the seat back and a forwardly displaced loading position thereof, the toothed portion of said pawl is engageable with the smooth part of said arcuate portion, and that during movement of the seat back between the intermediate erect position and the full reclining position the toothed portion of said pawl is engageable with the toothed part of the arcuate edge portion.

18 Claims, 2 Drawing Figures

SEAT RECLINER HINGE ASSEMBLY

CROSS-REFERENCE TO RELATED APPLICATION

The present invention is an improvement over my copending prior applications Ser. Nos. 552,974, now U.S. Pat. No. 3,973,288 and 651,716, now abandoned.

BRIEF SUMMARY OF THE INVENTION

The present invention relates to hinge structure comprising pivotally interconnected hinge parts adapted to be respectively connected to a seat back and a vechicle seat. The construction permits the seat back to be inclined rearwardly from an intermediate erect position to a full reclining position and to be positively locked in any intermediate position. In addition, the construction provides for free movement of the seat back between the intermediate erect position and a forwardly displaced loading position.

The invention is characterized by a design which permits the operating part to be formed from flat sheet material, cut and shaped to required configuration. The design includes structure insuring adequate support between relatively movable parts without the necessity for expensive bearings and the like.

Essentially, the construction comprises a pair of plates and pivot means interconnecting the plates. One of the plates is provided with means for attachment to a stationary part of the vehicle seat and the other plate is provided with means for connection to the seat back.

One of the plates is provided with an arcuate edge portion concentric with the axis of the pivot means. The angular extent of the arcuate edge portion corresponds to the desired angular movement of the seat back from its fully reclining position to its fully forwardly displaced loading position. A part of the arcuate edge is provided with locking teeth and the remainder of the arcuate edge is smooth. The other plate has movably connected thereto a locking pawl having teeth cooperable with the teeth on the arcuate edge and adapted to positively lock the seat back against forward or reverse movement in any position between the intermediate erect position and the full reclining position.

Associated with the pawl is a cam movably connected by the other plate, the cam having spring means connected thereto urging the cam in a direction to move the pawl toward the arcuate edge portion. When the teeth on the pawl overlie the smooth part of the arcuate edge portion, the seat back is substantially freely movable to permit movement of the seat back to the forward loading position, which in turn permits passengers to enter the rear seat of a two-door vehicle without inconvenience. However, as soon as the seat back is moved to the intermediate erect position from a position forwardly thereof, and if the cam is at this time released for actuation by the spring, the teeth on the pawl will engage with the teeth on the arcuate edge portion and lock the plates against relative pivotal movement. However, the cam has a manual operating handle associated therewith and may be moved to a position both to release the pawl and to positively move its toothed portion away from the arcuate edge. This permits the seat back to be moved rearwardly by the occupant to any desired position, at which time the cam is released and will cam the locking pawl into locking engagement with the toothed part of the arcuate edge.

The pivot means interconnecting the plates comprises a pivot stud passing through an opening in one of the plates, and the portion of the last mentioned plate is domed so as to provide limited engagement between said plates in a relatively narrow annular zone surrounding the stud. One of the plates, as previously described, includes an arcuate edge portion. In order to stabilize the plates during relative pivotal movement therebetween the other plate which carries the locking pawl has a tang struck out from the plate at an intermediate portion thereof which overlies and engages one side of the arcuate edge portion of the one plate. The other plate includes a second portion displaced laterally from the plane of the tang and adapted to engage the other side surface of the edge portion. Accordingly, the arcuate edge portion of said one plate is stabilized and guided in its relative pivotal movement between the tang and displaced plate portion at a point substantially removed from its pivot axis. This provides for relative free pivotal movement in a simple and inexpensive construction.

A third plate is provided and is rigidly connected to the plate which carries the pawl and cam so as to provide a housing space therebetween. This housing space is spanned by said stud and a counterbalance spring is provided in the space, one edge of which is rigidly connected to the stud and the other end of which is rigidly connected to one of the plates constituting the housing.

The last mentioned spaced plates include further spaced portions which are spanned by a shaft to which the cam is rigidly connected. At one side of the cam there is provided a bias spring which urges the cam against the pawl to provide locking action when the pawl is released. The pawl is also pivoted between spaced portions of the last mentioned plates and is essentially coplanar with the cam. The cam and pawl are both cut from flat stock of substantially the same thickness, and the provision of the bias spring at one side of the shaft carrying the cam requires spacing between one side of the pawl and an adjacent plate. In order to provide for stability of the pawl and to maintain it at all times in a coplanar relationship with respect to the arcuate edge portion, one of the rigidly interconnected plates is provided with an embossment having a rounded surface which engages one side of the pawl and maintains it in firmly supported sliding contact with the other of the two rigidly interconnected plates.

Figure 1:
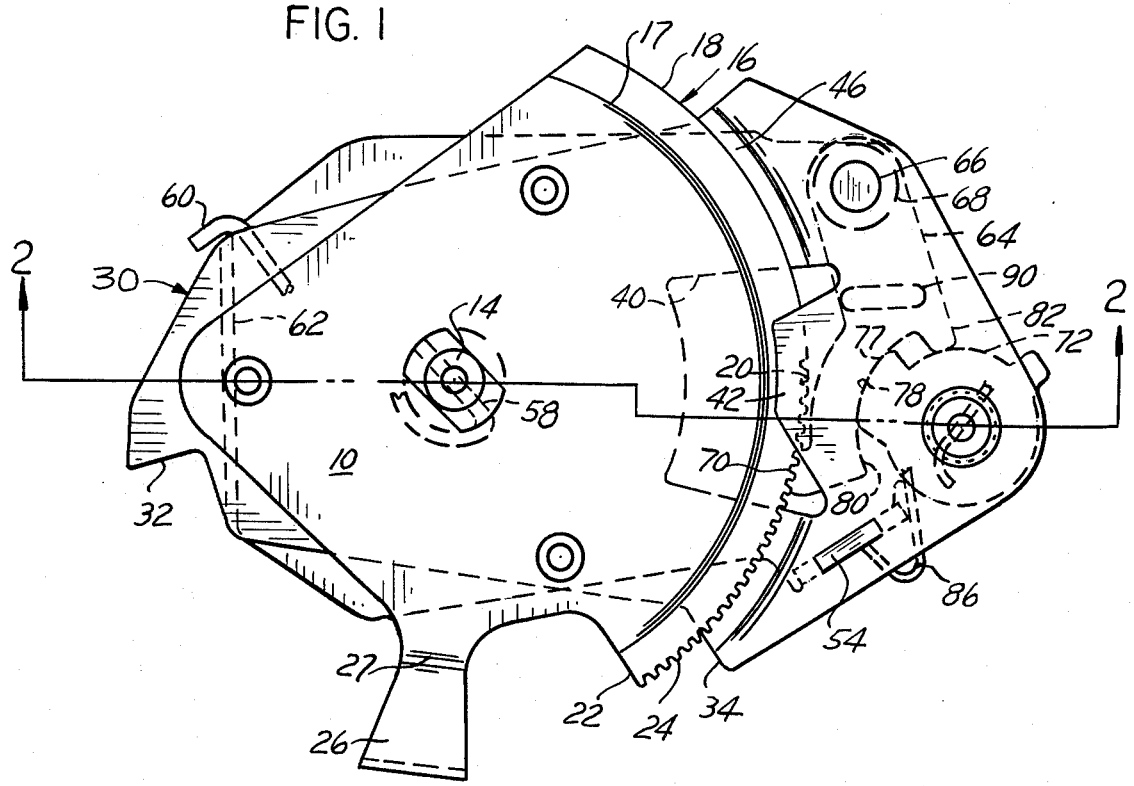
FIG. 1 is a plan view of the hinge construction.

DETAILED DESCRIPTION the hinge construction comprises a first plate 10 having an opening 12 receiving a reduced portion of a pivot stud 14, the plate 10 being formed of flat stock having an arcuate edge portion 16 displaced from the plane of the remainder of the plate 10 as indicated at 17. The arcuate edge portion 16 includes a smooth portion 18 which extends from one end of the arcuate portion 16 to an intermediate portion thereof as indicated at 20 and the remainder of the arcuate edge portion extending from the intermediate portion 20 to the opposite end of the arcuate portion as indicated at 22 is provided with a multiplicity of teeth 24.

The teeth 24 are relatively fine pitch and low pressure angle to provide a greater flexibility in selecting a location of the seat back and to minimize forces tending to bring about disengagement between the teeth on the arcuate portion of the plate and the locking teeth on a pawl.

The plate 10 further is provided with a stop finger 26 which is bend downwardly as indicated at 27 from the plane of the plate 10.

Associated with the plate 10 is a second plate 30 which is also formed from flat stock cut and bent to the configuration illustrated. The plate 30 is cut to provide oppositely facing shoulders or abutments 32 and 34. Plate 30 at the intermediate portion is embossed or domed as indicated at 36 and is apertured as indicated at 38 for the reception of the stud 14. It will be observed from FIG. 1 that the shoulders 32 and 34 are engageable by the stop finger 26 provided on the plate 10 to limit swinging movement between the plates to an arc equal to the desired anuglar movement of the seat back from its fully reclining position to its fully forwardly displaced loading position.

Figure 2:
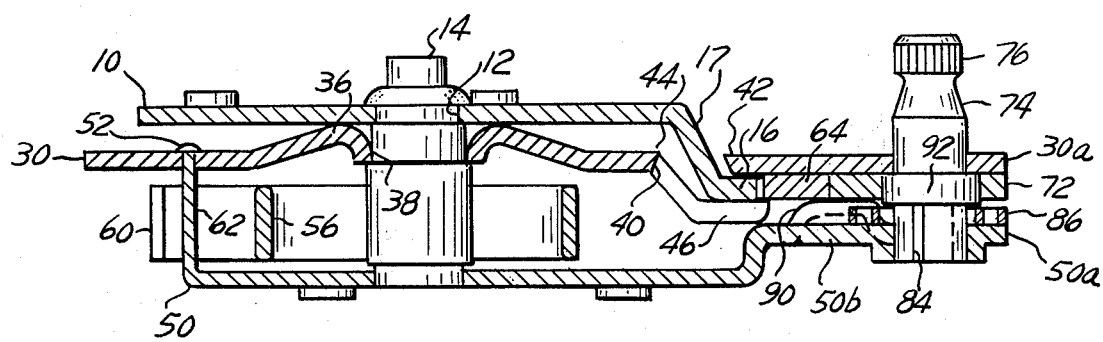
FIG. 2 is a sectional view on the line 2—2, FIG. 1.

The plate 30 is further provided with an opening 40 shaped to leave a tang 42 in the plane of the plate 30. The tang 42, as best seen in FIG. 2, overlies the arcuate edge portion 16 of the plate 10. In addition, the plate 30 is bent downwardly as indicated at 44 to provide an arcuate channel 46 in which the depressed arcuate edge portion 16 of the plate 10 is movable. It will thus be seen that the arcuate edge portion 16 of the plate 10 is guidingly supported and stabilized at a point remote from the pivot axis of stud 14 between parallel surfaces provided by the tang 42 and the bottom of the arcuate channel 46.

A third plate 50 is provided which is rigidly connected to the plate 30 as by riveting indicated at 52 and 54 and provides a space therebetween for the reception of a relatively strong coil counterbalance spring 56 one end of which is received in a slot provided in the stud 14 as indicated at 58, and the other end 60 of which engages a shoulder provided by the upwardly extending portion 62 of plate 50.

Intermediate spaced portions of the plates 30 and 50, designated at the right of FIG. 2 as 30a and 50a, are pawl and camming mechanism which will now be described.

A locking pawl 64 is pivotally mounted by a pivot pin 66 intermediate the plate portions 30a and 50a and is retained against the underside of the plate 30a by a spacing ring 68. The pawl 64 at its free end is provided with teeth 70 adapted to interfit with the teeth 24 on the sector plate 10. Associated with the pawl 64 is a cam 72 which is rigidly fixed to a shaft 74 the upper end of which is serrated as indicated at 76 for the attachment of a manual operating handle. The cam 72 and the pawl 64 are formed of flat stock and are coplanar as best seen in FIG. 2. The cam 72 includes a radially extending actuating portion 77 including a cam surface 78 cooperable with a cam surface 80 provided on the pawl. The arrangement is such that as the cam 72 is rotated counterclockwise as seen in FIG. 1, its cam surface 78 coacts with the cam surface 80 of the pawl to urge the pawl clockwise to bring its teeth 70 into engagement with the teeth 24 of the sector plate 10. The pawl 64 includes an ear 82 engageable by the actuating portion 77 of the cam as the cam is rotated clockwise from the position shown in FIG. 1. As the cam rotates clockwise the camming surfaces permit counterclockwise pivotal movement of the pawl and when the actuating portion 77 of the pawl engages the ear 82, the pawl is positively retracted in a clockwise direction to free the sector plate 10 for rotation.

Shaft 74 is provided with a slot 84 which receives one end of a coil bias spring 86 located at the side of the cam 72. The spring 86 biases the shaft 74 in a direction to cause the cam to move further counterclockwise as viewed in FIG. 1, and so to retain the toothed portion of the pawl in locking engagement with the toothed part of the arcuate portion of the sector plate 10.

The arcuate portion 16 of the plate 10, the pawl 64, and the cam 72 are all flat and coplanar. The arcuate portion 16 of the plate 10 is stabilized between the tang 42 and the bottom of the downwardly formed arcuate channel in the plate 30 as previously described. The pawl 64 is spaced above the portion of the plate 50 indicated at 50b as a result of providing space for the spring 86. In order to stabilize the pawl 64 and to limit its movement to free swinging movement about an axis of the pin 66, the plate 50 is provided with an upward embossment 90 which engages the underside of the pawl as clearly illustrated in FIG. 2. The cam 72 is fixedly secured to the enlarged portion 92 of the shaft 74 and of course requires no separate stabilization.

There is thus provided a very efficient seat reclining hinge characterized by the minimum number of parts, the provision of stabilizing and guiding embossments which eliminates the requirement for bearings and which maintains flat operating portions in the proper coplanar relationship.

In operation the counterbalace spring 60 is of sufficient strength to restore the seat back to its intermediate erect position whenever the cam 72 is moved to shift the pawl to release position. The reclining position of the seat back may be selected simply by acutating the cam 72 to release the pawl and moving the seat back against the bias of spring 56 to a desired position. At this time release of the manual lever for operating the shaft 74 will permit the spring 86 to actuate the cam 72 to move the pawl 64 to locking position. The seat back is movable forwardly from its intermediate erect position to provide ready access to the back seat of a two-door vehicle simply by releasing the pawl to permit the seat back to be moved forwardly of its intermediate erect position. Such movement may be intiated by the spring 56 which if desired may be selected to effect full movement of the seat back to its forward loading position. In such case, after the passenger for the rear seat has entered the vehicle, the seat back will be pulled rearwardly until it reaches its intermediate erect position. At this time, assuming the manual lever for actuating the shaft 74 is released, and pawl 64 will snap into engagement with the toothed part of the arcuate edge portion of the plate 10 and will hold the seat back positively in intermediate erect position.

If an occupant of the front seat desires to incline the seat back slighly rearwardly from its intermediate erect position, it is only necessary to operate the shaft 74 to actuate the cam 72 to release the pawl 64, at which time the seat back may be moved by rearward pressure by the occupant of the seat to a selected position, at which time release of the manual lever attached to the shaft 74 will permit the cam to snap the pawl into locking position. The camming surfaces 77 and 78 are selected such that a friction lock is established producing a wedging action which positively prevents shifting of the pawl by any forces applied thereto through the teeth 70.

In the illustrated embodiment of the invention, arcuate edge 16 of plate 10 constitutes a peripheral boundary of the plate, but it is recognized that of course the arcuate edge might be an edge of an opening lying within the peripheral edge of the plate.

What I claim as my invention is:

1. A seat recliner hinge comprising
a pair of plates, pivot means interconnecting said plates, said plates and pivot means being operable as a part of means hinging together a seat and seat back connected to said plates,
a first one of said plates having a pair of confronting abutments thereon spaced circumferentially about the axis of said pivot means at an angular spacing to provide the intended pivotal movement of said seat back from full reclining position to a forwardly displaced loading position,
the second one of said plates having an abutment thereon movable between the abutments on said first plate to limit pivotal movement between said plates to correspond to movement between full reclining and forwardly displaced loading positions of the seat back,
one of said plates having an arcuate edge portion concentric with the axis of said pivot means and of an angular extent substantially corresponding to the relative pivotal movement provided between said plates, a part of said edge portion having a multiplicity of locking teeth thereon, the remainder of said edge portion having a smooth arcuate periphery,
a locking pawl movably carried by the other of said plates and having a toothed portion,
resilient means biasing said pawl in a direction to cause its toothed portion to bear against said arcuate edge portion,
the smooth and toothed parts of the edge portion of said one plate and the toothed portion of said pawl being of such angular extent and location that during relative pivotal movement between said plates corresponding to movement of a seat back between full forwardly displaced loading position and intermediate erect position, the teeth on the toothed end portion of said pawl engage the smooth arcuate periphery of the said edge portion, and that during relative pivotal movement between said plates corresponding to movement of the seat back between intermediate erect position and full reclining position the teeth on the toothed portion of said pawl are engageable with teeth on the toothed part of said arcuate edge portion to lock the plates against pivotal movement and so to lock a seat back connected to one of said plates in any selected intermediate reclining position.

2. A hinge as defined in claim 1 in which the resilient means biasing said pawl comprises a manually operable cam carried by the plate which carries said pawl, and cooperating abutments on said pawl and cam effective to retract the toothed portion of said pawl from said arcuate edge portion, and spring means connected to said cam urging said cam in a direction to move the toothed portion of said pawl toward said arcuate edge.

3. A hinge as defined in claim 2 in which said pawl and cam include wedging surfaces engageable to lock said pawl in position with its teeth engaged with the teeth on said arcuate edge portion against displacement by any forces applied thereto through such teeth.

4. A hinge as defined in claim 3 in which said pawl and said cam are both pivotally mounted on the plate on which they are carried.

5. A hinge as defined in claim 2 in which said pawl and said cam are both pivotally mounted on the plate on which they are carried.

6. A seat recliner hinge comprising
a pair or plates, pivot means interconnecting said plates, said plates and pivot means being operatble as a part of means hinging together a seat and seat back connected to said plates,
one of said plates having an arcuate edge portion concentric with the axis of said pivot means and of an angular extent substantially corresponding to the relative pivotal movement provided between said plates, a part of said edge portion having a multiplicity of locking teeth thereon, the remainder of said edge portion having a smooth arcuate periphery.
a locking pawl movably carried by the other of said plates and having a toothed portion,
resilient means biasing said pawl in a direction to cause its toothed portion to bear against said arcuate edge portion,
the smooth and toothed parts of the edge portion of said one plate and the toothed portion of said pawl being of such angular extent and location that during relative pivotal movement between said plates corresponding to movement of a seat back between full forwardly displaced loading position and intermediate erect position, the teeth on the toothed end portion of said pawl engage the smooth arcuate periphery of the said edge portion, and that during relative pivotal movement between said plates corresponding to movement of the seat back between intermediate erect position and full reclining position the teeth on the tooth portion of said pawl are engageable with teeth on the toothed part of said arcuate edge portion to lock the plates against pivotal movement and so to lock a seat back connected to one of said plates in any selected intermediate reclining position.

7. A hinge as defined in claim 6, said other plate having a tang struck out therefrom intermediate the edges thereof overlying the arcuate edge portion of said one plate, guide portions of said other plate adjacent said tang underlying the said arcuate edge portion, said tang and guide portions being engageable with opposite sides of said edge portion.

8. A hinge as defined in claim 6 in which said other plate has a third plate rigidly affixed thereto in laterally spaced relation to provide a housing, said pivot means comprising a pivot stud fixed to said one plate, and a balance spring within said housing having one end fixed to said stud and the other end fixed to said housing.

9. A hinge as defined in claim 7 in which said other plate has a third plate rigidly affixed thereto in laterally spaced relation to provide a housing, said pivot means comprising a pivot stud fixed to said one plate, and a balance spring within said housing having one end fixed to said stud and the other end fixed to said housing.

10. A hinge as defined in claim 8 in which said pawl is pivoted within said housing between spaced portions of said other plate and said thrid plate, a rotatable shaft extending between the spaced portion of said other plate and said third plate to which said cam is fixed, said pawl and cam being flat and coplanar, a bias spring connected to said shaft intermediate said spaced plate portions and at one side of said cam, one of said other plate and third plate having an embossment engaging a side of said pawl to maintain it coplanar with said cam and with the arcuate edge portion of said one plate.

11. A seat recliner hinge comprising a pair of plates, pivot means interconnecting said plates, said plates and pivot means being operable as a part of means hinging together a seat and seat back connected to said plates, one of said plates having an arcuate edge portion concentric with the axis of said pivot means and of an angular extent substantially corresponding to the relative pivotal movement provided between said plates, a part of said edge portion having a multiplicity of locking teeth thereon, the remainder of said edge portion having a smooth arcuate periphery.

a locking pawl movably carried by the other of said plates and having a toothed portion, said other plate having a first planar portion including a tang struck out therefrom and providing an opening through said other plate, said other plate having a second planar portion offset from the plane of said first portion substantially at said opening to provide a shoulder through which said opening extends, the arcuate edge portion of said one plate extending into the space between said tang and the second portion of said other plate.

12. A hinge as defined in claim 11 in which the toothed portion of said pawl is movable through the opening in said shoulder to engage the arcuate edge portion of said one plate.

13. A seat recliner hinge comprising a pair of plates, pivot means interconnecting said plates, said plates and pivot means being operable as a part of means hinging together a seat and seat back connected to said plates, one of said plates having an arcuate edge portion concentric with the axis of said pivot means and of an angular extent substantially corresponding to the relative pivotal movement provided between said plates, a part of said edge portion having a multiplicity of locking teeth thereon, the remainder of said edge portion having a smooth arcuate periphery.

a locking pawl movable carried by the other of said plates and having a toothed portion in which the central portion of said other plate receiving said pivot means is domed to provide an annular bearing surface of limited radial extent for said one plate, said other plate having portions including a tang struck out therefrom engageable with opposite sides of the arcuate edge portion of said one plate to stabilize said arcuate edge portion against movement transverse to the plane occupied by said arcuate edge portion.

14. A hinge as defined in claim 13 comprising a third plate fixed to said other plate and laterally spaced therefrom, said third plate having an embossment extending toward said other plate to stabilize said pawl between said other plate and said third plate.

15. A seat recliner hinge comprising a pair of plates, pivot means interconnecting said plates, said plates and pivot means being operable as a part of means hinging together a seat and seat back connected to said plates, one of said plates having an arcuate edge portion provided with a series of locking teeth, a locking pawl pivoted to the other of said plates and having a toothed portion movable into and out of locking engagement with the teeth on the arcuate edge of said one plate, said other plate having relatively laterally displaced parallel portions engageable in guiding relation with opposite sides of said arcuate edge portion.

16. A hinge as defined in claim 15, said other plate having an opening between its laterally displaced parallel portions through which said locking pawl extends.

17. A hinge as defined in claim 16, said pawl and the said one plate being formed from flat stock of substantially the same thickness, one of the laterally displaced portions of said other plate being engageable with the corresponding side of both of said arcuate edge portion and said pawl to support them in coplanar relationship.

18. A hinge as defined in claim 17 in which said other plate has a third plate fixed thereto, said pawl being pivoted between said other plate and said third plate, said third plate having an embossment therein engageable with the other side of said pawl to maintain it in coplanar relationship with the arcuate edge portion of said one plate.

* * * * *